US010558186B2

(12) United States Patent
Mohamadi

(10) Patent No.: US 10,558,186 B2
(45) Date of Patent: Feb. 11, 2020

(54) DETECTION OF DRONES

(71) Applicant: Farrokh Mohamadi, Irvine, CA (US)

(72) Inventor: Farrokh Mohamadi, Irvine, CA (US)

( * ) Notice: Subject to any disclaimer, the term of this patent is extended or adjusted under 35 U.S.C. 154(b) by 116 days.

(21) Appl. No.: 15/783,865

(22) Filed: Oct. 13, 2017

(65) Prior Publication Data

US 2018/0107182 A1    Apr. 19, 2018

Related U.S. Application Data

(60) Provisional application No. 62/407,951, filed on Oct. 13, 2016.

(51) Int. Cl.
*G05B 17/02* (2006.01)
*G06K 9/32* (2006.01)
*G06K 9/46* (2006.01)

(52) U.S. Cl.
CPC .......... *G05B 17/02* (2013.01); *G06K 9/3241* (2013.01); *G06K 9/46* (2013.01); *G06T 2207/20081* (2013.01)

(58) Field of Classification Search
CPC .. G05B 17/02; G06K 9/00771; G06K 9/6293; G06K 9/4628; G06K 9/46; G06K 9/3241; G06T 2207/20081
See application file for complete search history.

(56) References Cited

U.S. PATENT DOCUMENTS

| 9,110,168 | B2 | 8/2015 | Mohamadi | |
|---|---|---|---|---|
| 9,316,733 | B2 | 4/2016 | Mohamadi | |
| 9,322,917 | B2 | 4/2016 | Mohamadi | |
| 9,329,001 | B2 | 5/2016 | Mohamadi | |
| 10,140,515 | B1 * | 11/2018 | Waldo | G06K 9/00684 |
| 2009/0003599 | A1 * | 1/2009 | Hart | H04L 67/2823 380/209 |
| 2014/0324591 | A1 * | 10/2014 | Kim | H04W 4/043 705/14.58 |
| 2016/0159472 | A1 * | 6/2016 | Chan | B64C 27/08 244/39 |
| 2016/0350886 | A1 * | 12/2016 | Jessen | G06Q 50/184 |
| 2017/0059692 | A1 * | 3/2017 | Laufer | G01S 7/38 |
| 2017/0132468 | A1 * | 5/2017 | Mosher | G06T 7/246 |
| 2017/0148467 | A1 * | 5/2017 | Franklin | G10L 25/51 |
| 2017/0185846 | A1 * | 6/2017 | Hwangbo | G06K 9/00751 |
| 2017/0200050 | A1 * | 7/2017 | Zhang | G06K 9/00751 |
| 2017/0364771 | A1 * | 12/2017 | Pinheiro | G06K 9/00201 |
| 2018/0127006 | A1 * | 5/2018 | Wade | B61L 27/0088 |
| 2018/0203851 | A1 * | 7/2018 | Wu | G06N 3/006 |

* cited by examiner

*Primary Examiner* — Ming Y Hon
(74) *Attorney, Agent, or Firm* — Haynes and Boone, LLP

(57) ABSTRACT

A pre-trained convolutional network is trained to accurately distinguish between video images of different types of drones. In addition, a neural network is also trained to distinguish between the drones based upon their audio signatures.

8 Claims, 4 Drawing Sheets

DETECTION OF DRONES

CROSS-REFERENCE TO RELATED APPLICATIONS

This application claims the benefit of U.S. Provisional Application No. 62/407,951, filed Oct. 13, 2016.

TECHNICAL FIELD

This application relates to pattern recognition, and more particularly to the detection of drones using both images and audio spectrums.

BACKGROUND

This invention addresses development and demonstration of a small unmanned aerial system (sUAS) detection system that operates by using machine vision and deep learning to address classification of a sUAS as friendly or foe. A wide angle video camera, an array of directional microphones, and an optional mmWave radar stream the raw information to a processor such as a graphics processing unit (GPU).

Existing systems solely based on radar are inefficient in identifying a friendly or foe sUAS and can easily get confused with the approaching birds. They are also not capable to jam advanced guidance system of some sUASs. Moreover, the mechanical rotating scanner of conventional radars can be readily detected by a sUAS. The system disclosed herein solves problems and enables ready detection of drones, foe or friendly. Upon detection of the adversary sUAS, capturing nets that are commercially available can be used to neutralize the approaching sUAS by a soft landing.

Accordingly, there is a need in the art for improved drone detection.

SUMMARY

A drone detection station is provided that includes one or more cameras for capturing video images. The detection station may also include one or more microphones for capturing audio data. The detection station includes a processor and controller unit for capturing the frames of video and audio data so that the captured data may be wirelessly transmitted through a wireless transmitter in the detection station. The resulting captured data may thus be streamed to the cloud or to another processing unit that includes a suitable processor such as a graphics processing unit (GPU). The GPU incorporates a pre-trained commercial off-the-shelf (COTS) convolutional neural network (CNN) that is further trained on images of drones and, e.g., birds. The resulting detection of drones by the CNN maybe be further confirmed by a human operator viewing the same video data.

These and other advantageous features may be better appreciated through the following detailed description.

BRIEF DESCRIPTION OF THE DRAWINGS

FIG. 4 illustrates the receiver operating characteristics for the detection of the drones from their power spectral densities of FIG. 3.

Embodiments of the present disclosure and their advantages are best understood by referring to the detailed description that follows. It should be appreciated that like reference numerals are used to identify like elements illustrated in one or more of the figures.

DETAILED DESCRIPTION

To quickly and accurately detect drones or other types of unmanned aerial systems, a commercial off-the shelf (COTS) pre-trained convolutional neural network (CNN) is exploited by further training the CNN on images not related to the images for its pre-training. In particular, images of drones and birds were used to provide this further training. As compared to traditional uses of radar to detect drones, the resulting detection has much greater accuracy yet requires relatively little computing complexity. For example, accuracies of 97% or greater were achieved in distinguishing between various types of drones and also non-drones such as birds. The resulting automated detection enables prolonged operation of the cameras and microphones.

Figure 1:
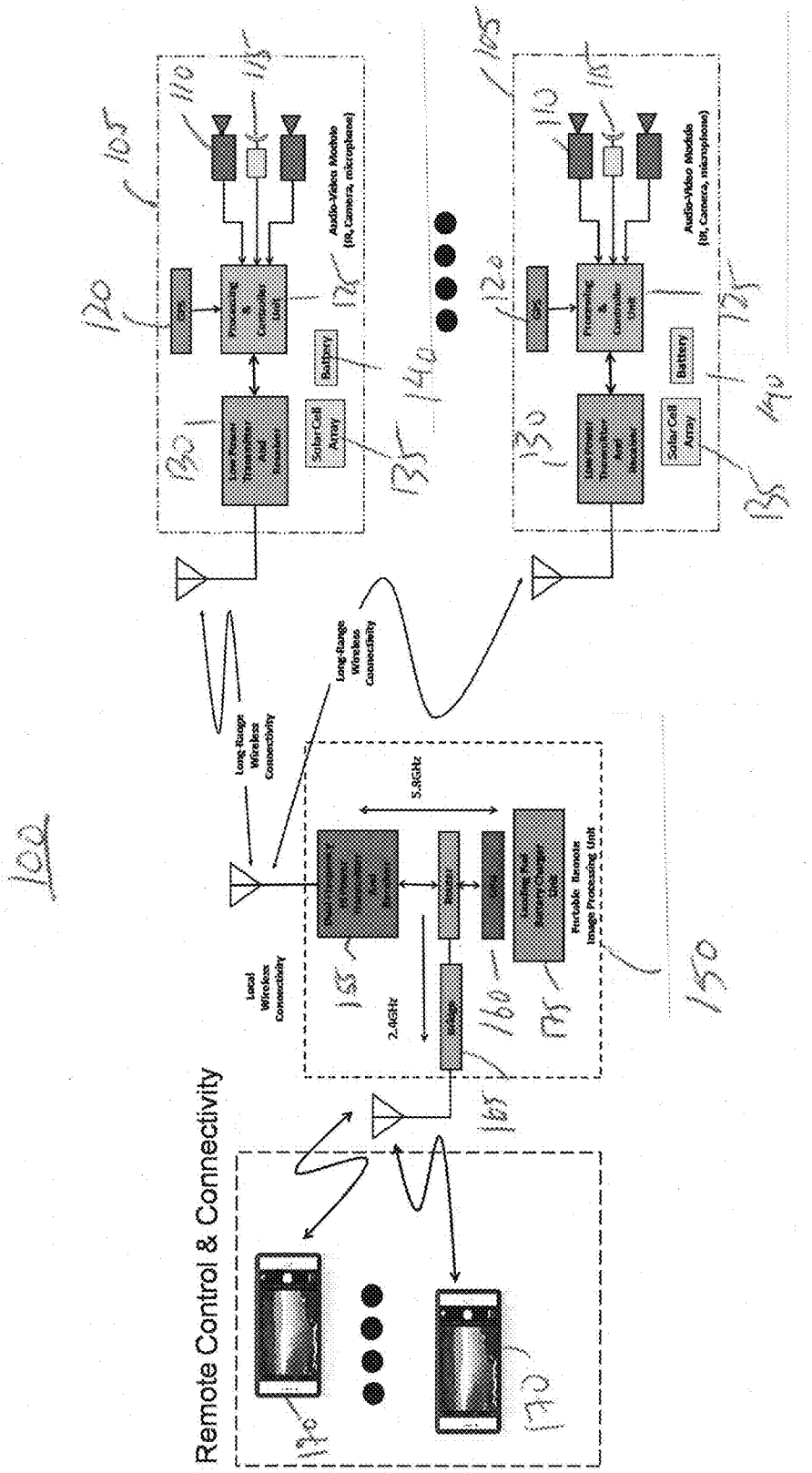
FIG. 1 is a diagram of an example video and audio drone detection system in accordance with an aspect of the disclosure.

An example drone detection system 100 is shown in FIG. 1. A plurality of detection stations 105 are distributed across an area of interest in which drone activity is suspected. Each detection station 105 includes one or more video cameras 110. In addition (or in the alternative), each detection station 105 includes one or more microphones 115 for capturing audio data. The resulting frames of video and audio data are processed by a processing and controller 125 so that the processed frames of video and/or audio data may be transmitted over a low-power transceiver 130. For example, transceiver 130 may comprise a cellular telephone link or instead may be a secured RF transceiver. So that the resulting detection of drones may be triangulated, each detection station 105 may include a GPS module 120 or another suitable satellite-based positioning system to provide the location of each detection station 105. Power may be provided by a battery 140 such as charged through a solar cell array 135.

In one embodiment, each detection station may include a suitable processor such as processor and controller 125 for implementing a convolutional neural network (CNN). The following discussion, however, will be directed to the implementation of CNN processing offline from the detection stations to lower their cost and provide enhanced audio and video processing capability. However it will be appreciated that the image performed by the CNN may be implemented within detection stations 105 in alternative embodiments. Similarly, each detection station 105 may include a neural network for processing the audio spectrums but the following discussion will be directed to the implementation of the neural network remotely from detection stations 105. A remote pattern recognition station 150 receives the transmitted frames of video and audio data from detection stations 150 through a transceiver 155. For example, the RF communication between the detection stations 105 and pattern recognition station 150 may use a 5.8 GHz RF carrier although other RF frequencies may be used in alternative embodiments. A suitable processor such a graphics processing unit (GPU) 160 implements the CNN. Advantageously, it has been discovered that remarkable accuracy may be achieved through the use of COTS convolutional neural networks such as the MatLab-based "AlexNet" CNN. Such COTS CNNs are typically pre-trained on the "ImageNet"

database, which has 1,000 object categories trained on approximately 1.2 million images. Pattern recognition station 150 may include a router 165 for communicating the resulting detections of drones over a bridge 165 and a wireless link to remote tablets or cellular phones 170. A human user may thus confirm the detection of the drone through examination of the corresponding video frames. A battery 175 powers pattern recognition station 150.

Figure 2:
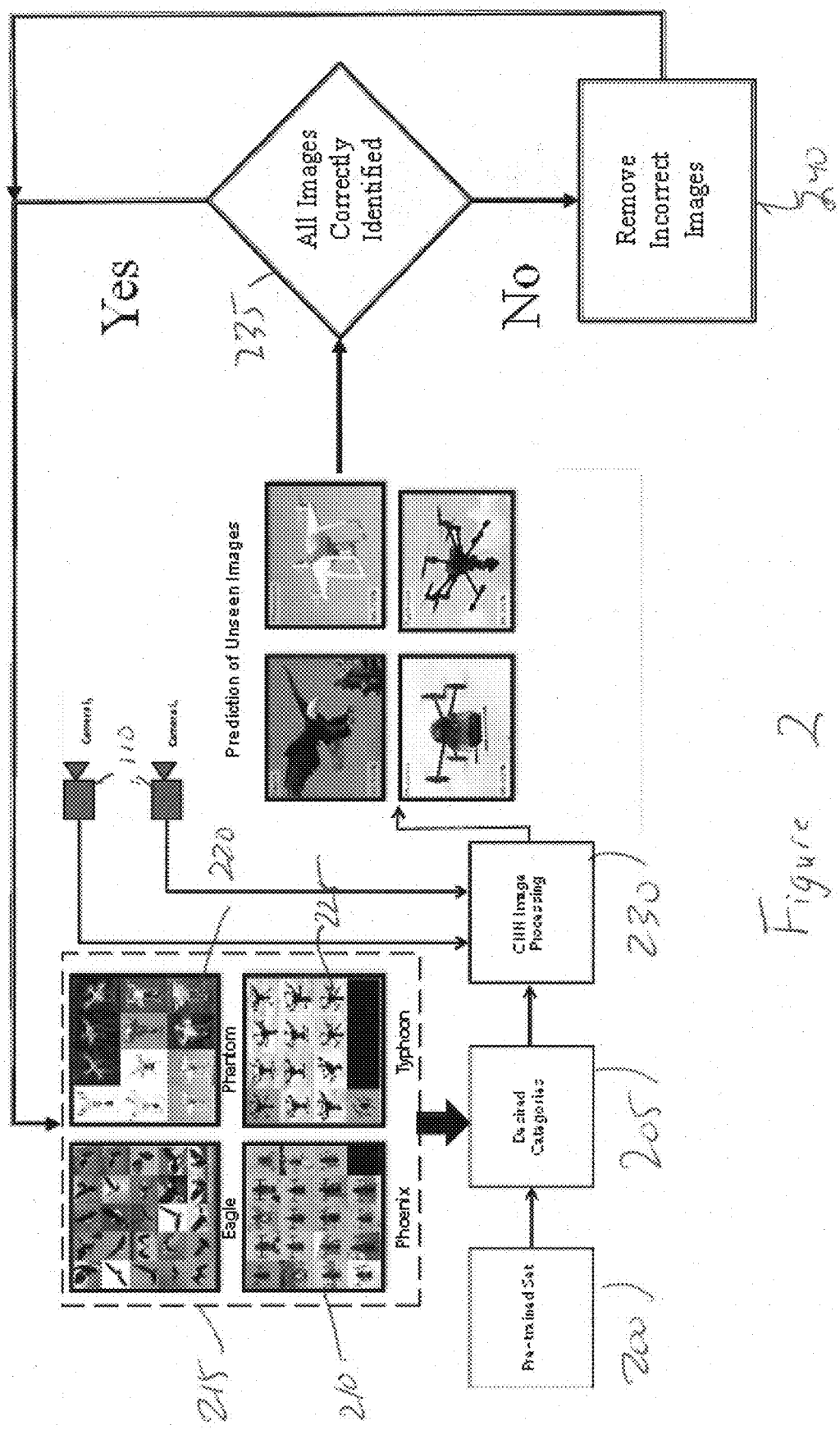
FIG. 2 illustrates the recursive training of the convolutional neural network in the detection system of FIG. 1.

The CNN as programmed into GPU 160 is further trained as shown in FIG. 2. The CNN is pre-trained by its developer using an image set 200 such as the ImageNet image database discussed above. The pre-trained CNN is then trained on the desired image categories 205. In this embodiment, images of three different drones were used, designated as the Phoenix drone images 210, Typhoon drone images 225, and Phantom drone images 220. In addition, a set of bird images 215 (such as images of a bald eagle) were also used to construct the desired categories 205 of images for further training the pre-trained CNN. GPU 160 of FIG. 1 could then process image frames from cameras 110 in a CNN image processing and classification step 230. The results were remarkably accurate. In particular, the bird images were identified with an accuracy of 92.5% whereas the drones were identified with accuracies of 95% or greater.

To further increase accuracy of the resulting CNN image processing, the images within the desired categories 205 for additional training of the pre-trained CNN may be refined by an act 235 in which is it is determined whether all the images received from camera 110 are processed correctly and then added to a training database, further enhancing the CNN's ability to distinguish between desired categories 205. Should some images be incorrectly identified, they are removed from the image database in a step 240, whereupon the pre-trained CNN is re-trained on the refined database of images 205. Conversely, database 205 is bolstered by the addition of new and correctly identified images. Such recursive correction of the training database may be performed manually or may be automated by using a threshold to remove low scored images. For example, accuracies of 99% were achieved through such recurrent training on a database of 4,000 images. Drone detection may continue at night through the use of infra-red cameras with a similar accuracy.

Figure 3:
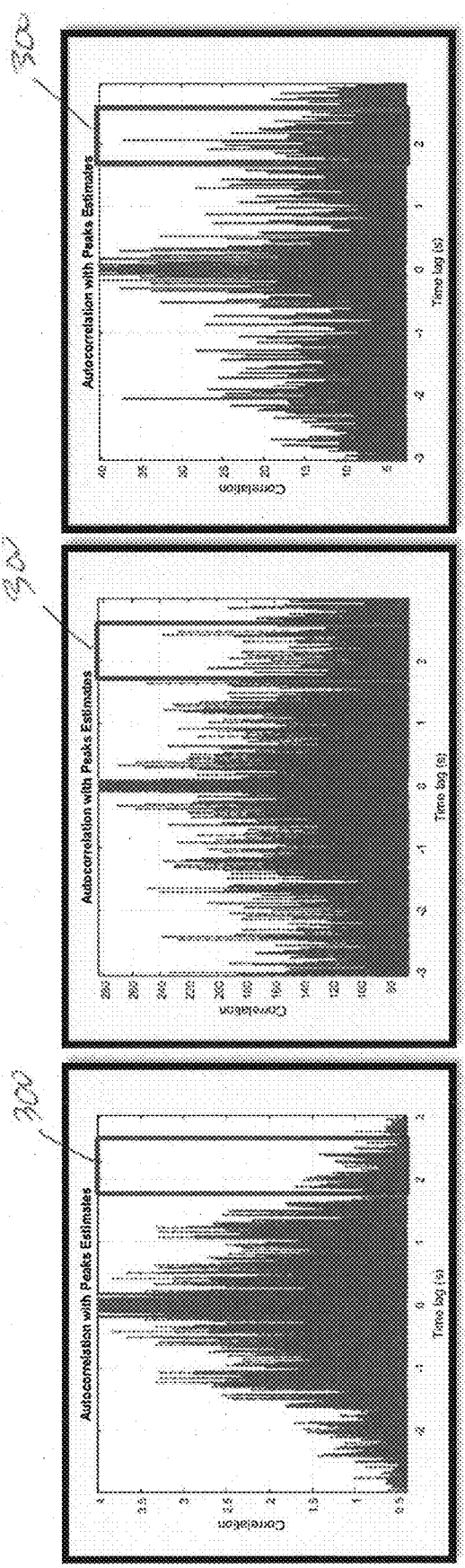
FIG. 3 illustrates the audio power spectral densities for 3 different types of drones.
Figure 1:
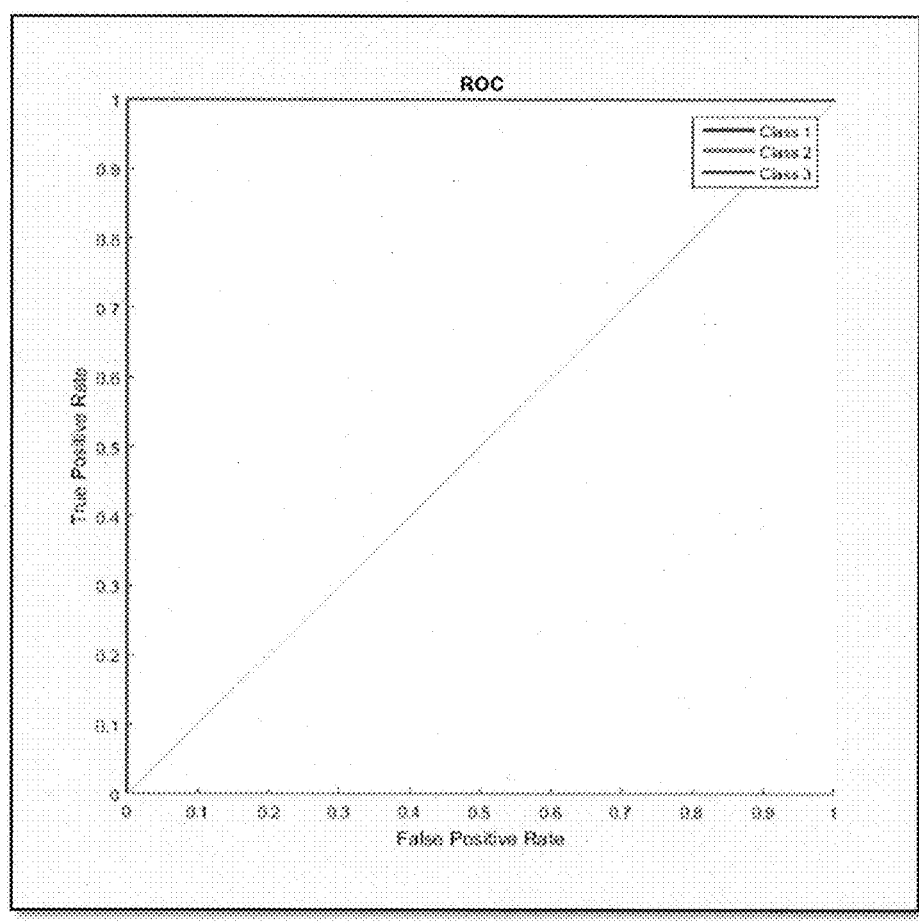

To increase accuracy of drone detection when even infra-red cameras cannot be used such as caused by smoke, rain, or fog, GPU 160 or a similar processor may analyze the audio data using an analogous neural network (NN). In particular, the audio data may be transformed using a Fourier transform. In one embodiment, the Welch power spectral density may thus be obtained for the streamed audio. It will be appreciated that alternative methods in addition to the Welch process may be used to obtain the power spectral density. The resulting power spectral densities for the desired categories are then obtained to form a training database analogous to database 205 to train the neural network. This training database may then be recursively improved as discussed with regard to FIG. 2 to improve the accuracy of the detections. Example audio power spectral densities for a Phoenix, Phantom, and Typhoon drones are shown in FIG. 3. To ease the computational burden and increase processing time, just a sub-band 300 of the entire spectral density is analyzed. In alternative embodiments, the entire power spectral density may be analyzed by the neural network.

As demonstrated in FIG. 3, by correlating the power density, the spectrums of the recorded audios are unique for each sUAS (drone) design. The audio power spectra at bin number 300 is highly differentiable between the three types of sUASs. The spectra changes with the attached weight to the sUAS and may be a complementary feature for the assessment of explosives attached to the sUAS. The uniqueness provides another degree of freedom to classify the sUAS based on their intrinsic and weight-added characteristics; hence, it provides another analytical tool to classify the sUAS as recreational or a threat. The optical and audio classifications will then be able to predict the threat level with high accuracy. This feature is a complementary augmentation to that of video streaming when the system operates in crowded areas, such as stadiums, bazaars, factories, religious gatherings, government facilities and markets, where recreational sUASs can be present and pose risks.

The neural network is then designed by using the attributes of the neighborhoods to be trained to produce the correct target classes. Data for classifications is set up by organizing the data into two matrices: the input matrix (X) and the target matrix (T). Each column of the input matrix will have three entries representing a material whose category is already known. Each corresponding column of the target matrix will have three elements, consisting of two zeros and a one in the location of the associated category (i.e., Phantom, Phoenix, and Typhoon). By using two layers of an Encoder, as well as a Softmax Layer, the network then stacks the encoders and the Softmax layers to form a deep network.

Each encoder has a hidden layer size of 10 and a linear transfer function for the decoder. The layer 2 weight regularizer was set to (0.001 to 0.1), sparsity regularizer to (0.1 to 10) and sparsity proportion to (0.01 to 1). Training was performed by using the Scaled Conjugate Gradient. Epochs were set from 10 to 1,000, and expected performance was from 0 to 0.5 with a gradient of 1e-8 to 1. FIG. 4 shows a receiver operating characteristic (ROC) plot from the processing of the audio for the three types of drones (designated as Class 1, Class 2, and Class 3). The farther left and up the line is, the fewer false positives need to be accepted in order to get a high true positive rate. The best classifiers will have a line going from the bottom left corner, to the top left corner, to the top right corner, as is the case with all of the three classes.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A system for classifying drones, comprising:
    a detection station including:
        at least one camera for capturing raw video frames;
        a processor for pre-processing video frames from the at least one camera;
        a first transceiver for transmitting the raw or pre-processed video frames; and
    a pattern recognition station including:
        a second transceiver for receiving the transmitted raw or pre-processed video frames;
        a convolutional neural network for analyzing the transmitted raw or pre-processed video frames to identify drones, wherein the convolutional neural network is pre-trained in a first step on a first database that doesn't include the drones and is further pre-trained in a second step on a second database of images of drones and birds.

2. The system of claim 1, wherein the detection station comprises a plurality of detection stations, wherein each detection station includes a plurality of cameras.

3. The system of claim 1, wherein the detection station includes a solar array for charging a battery to power the detection station.

4. The system of claim 1, wherein the pre-trained convolutional neural network is further trained on a database of drone images.

5. The system of claim 4, wherein the training on the database of drone images is a recursive training in which incorrectly identified drone images are not added to the database of drone images.

6. The system of claim 1, wherein the convolutional neural network further comprises a graphics processing unit.

7. The system of claim 1, wherein the detection station further comprises a microphone for capturing raw audio data, and wherein the processor is further configured to process the raw audio data from the microphone, and wherein the transceiver is further configure to stream the processed or raw audio data.

8. The system of claim 7, wherein the pattern recognition station further includes a neural network for analyzing a power spectral density for the streamed processed audio data to identify the drones through their audio signature.

* * * * *